United States Patent
Sato

(10) Patent No.: US 7,404,759 B2
(45) Date of Patent: Jul. 29, 2008

(54) SPINAL COLUMN REMOVING METHOD AND SPINAL COLUMN REMOVING APPARATUS

(75) Inventor: Atsushi Sato, Kushiro (JP)

(73) Assignee: Meat Technology R & D Partnership, Tokyo (JP)

( * ) Notice: Subject to any disclaimer, the term of this patent is extended or adjusted under 35 U.S.C. 154(b) by 0 days.

(21) Appl. No.: 11/578,430

(22) PCT Filed: Mar. 1, 2005

(86) PCT No.: PCT/JP2005/003360

§ 371 (c)(1),
(2), (4) Date: Oct. 13, 2006

(87) PCT Pub. No.: WO2005/099462

PCT Pub. Date: Oct. 27, 2005

(65) Prior Publication Data

US 2007/0275648 A1    Nov. 29, 2007

(30) Foreign Application Priority Data

Apr. 16, 2004  (JP) .............................. 2004-122168

(51) Int. Cl.
A22C 17/00    (2006.01)

(52) U.S. Cl. .................................................. 452/157

(58) Field of Classification Search ......... 452/149–157, 452/160
See application file for complete search history.

(56) References Cited

U.S. PATENT DOCUMENTS

| 4,503,587 A | * | 3/1985 | Martin ....................... 452/169 |
| 5,302,149 A | * | 4/1994 | Witham et al. ............... 452/135 |
| 5,334,084 A | * | 8/1994 | O'Brien et al. ............. 452/157 |
| 5,554,069 A | * | 9/1996 | Burch et al. ................. 452/149 |
| 6,200,211 B1 | * | 3/2001 | Braeger et al. .............. 452/162 |
| 7,179,163 B1 | * | 2/2007 | Vedsted et al. .............. 452/121 |

FOREIGN PATENT DOCUMENTS

| JP | 05-153901 | 6/1993 |
| JP | 08-228667 | 9/1996 |
| JP | 09-23809 | 1/1997 |
| JP | 2002-125581 | 5/2002 |

* cited by examiner

Primary Examiner—Thomas Price
(74) Attorney, Agent, or Firm—William L. Androlia; H. Henry Koda

(57) ABSTRACT

The method for removing a spinal column from a block of meat which includes detecting the position and shape of the spinal column in the block of meat that includes at least a part of the spinal column and cutting the block of meat in the vicinity of the spinal column in a V-letter form from two directions by three-dimensionally controlling the position of a cutter based on data concerning the detected position and shape of the spinal column.

5 Claims, 7 Drawing Sheets

SPINAL COLUMN REMOVING METHOD AND SPINAL COLUMN REMOVING APPARATUS

TECHNICAL FIELD

The present invention relates to a spinal column removing method and a spinal column removing apparatus for removing the spinal column from a block of meat of animals such as cows, pigs, horses, and sheep, which is sectioned out from a half-body of the animal that is being cut in the longitudinal direction. More specifically, it relates to a spinal column removing method and a spinal column removing apparatus, which enable to remove the spinal column while reducing the amount of removed meat as much as possible.

BACKGROUND ART

Slaughtered animals such as cows, pigs and sheep are cut in the longitudinal direction by dividing the spinal column into two as two animal-half-bodies to be used for food. Then, the animal-half-body including the spinal column is cut into three in the longitudinal direction so as to be divided into three parts of shoulder loin part, loin/rib part, and thigh part for making three blocks of meat. Subsequently, the spinal column, the ribs, and other bones are removed from each block of meat. Conventionally, the spinal column has been removed by cutting the meat in parallel with the spinal column using a round edge cutter as in Japanese Patent Laid-open Publication No. 5-153901.

Japanese Patent Laid-open Publication No. 5-153901,

DISCLOSURE OF THE INVENTION

Problems to be Solved Resolved by the Invention

As described above, when the spinal column is cut into three along the longitudinal direction thereof for making three blocks of meat from the animal-half-body, the sectioned spinal column comes under the state where the stress is eliminated. Thus, the spinal column may be twisted in a complicated manner.

However, the above-described spinal column removing apparatus disclosed in the above Patent Publication No. 5-153901 removes the spinal column by simply cutting meat and bones linearly rather than in parallel with the spinal column. Thus, in order to completely remove the twisted spinal column, it is necessary to cut the meat of an area which is largely distant from the spinal column. Accordingly, a yield of meat in terms of quantity is bad.

Therefore, in Japan, currently, skilled workers remove the spinal column by handwork so that it is not possible to remove the spinal column efficiently in terms of time.

In view of the aforementioned aspects, an object of the present invention therefore is to provide a spinal column removing method and a spinal column removing apparatus, which can remove the spinal column from a block of meat efficiently in terms of time and with a good yield of meat quantity.

Means of Solving the Problems

In order to achieve the aforementioned objects, the spinal column removing method of the present invention is characterized in that: it detects position and shape of a spinal column in a block of meat that includes at least a part of the spinal column, and cuts the block of meat in the vicinity of the spinal column in a V-letter form from two directions by three-dimensionally controlling posture of a cutter based on an image data about the detected position and shape of the spinal column so as to remove the spinal column from the block of meat. By employing such structure, it enables to surely remove the spinal column with the minimum amount of meat.

The spinal column removing apparatus of the present invention is characterized in that the spinal column removing apparatus comprises: a laser oscillator which irradiates a laser beam to a block of meat that includes at least a part of a spinal column; a charge-coupled device camera which detects position and shape of the spinal column in the block of meat by detecting the laser beam that is irradiated to the block of meat; a control means which calculates the position and shape of the spinal column from an image data that is detected by the charge-coupled device camera; a robot whose posture is three-dimensionally controlled by a control signal from the control means; and a round edge cutter to be driven rotationally, which is supported to the robot, wherein the block of meat in the vicinity of the spinal column is cut in a V-letter form from two directions by the round edge cutter so as to remove the spinal column from the block of meat. By employing such structure, it enables to surely remove the spinal column with the minimum amount of meat through cutting the meat from the two directions by a single round edge cutter.

The other spinal column removing apparatus of the present invention is characterized in that the spinal column removing apparatus comprises: a laser oscillator which irradiates a laser beam to a block of meat that includes at least a part of a spinal column; a charge-coupled device camera which detects position and shape of the spinal column in the block of meat by detecting the laser beam that is irradiated to the block of meat; a control means which calculates the position and shape of the spinal column from an image data that is detected by the charge-coupled device camera; a pair of robots whose postures are three-dimensionally controlled, respectively, by a control signal from the control means; and round edge cutters to be driven rotationally, which are supported to each of the robots, wherein the block of meat in the vicinity of the spinal column is cut in a V-letter form from two directions by the pair of round edge cutters so as to remove the spinal column from the block of meat. By employing such structure, it enables to surely remove the spinal column with the minimum amount of meat through cutting the meat from the different directions almost simultaneously by each of the two round edge cutters.

Further, the V-letter form is to have an arbitrary angle of less than 180 degrees.

Effect of the Invention

As described above, with the spinal column removing method and the spinal column removing apparatus according to the present invention, it enables to remove the spinal column from a block of meat efficiently in terms of time and with a good yield of meat quantity.

Especially, use of two round edge cutters enables to remove the spinal column from a block of meat more efficiently in terms of time through cutting the meat by shifting the positions such that the edge points of both round edge cutters do not come in contact.

BEST MODE FOR CARRYING OUT THE INVENTION

Figure 1:
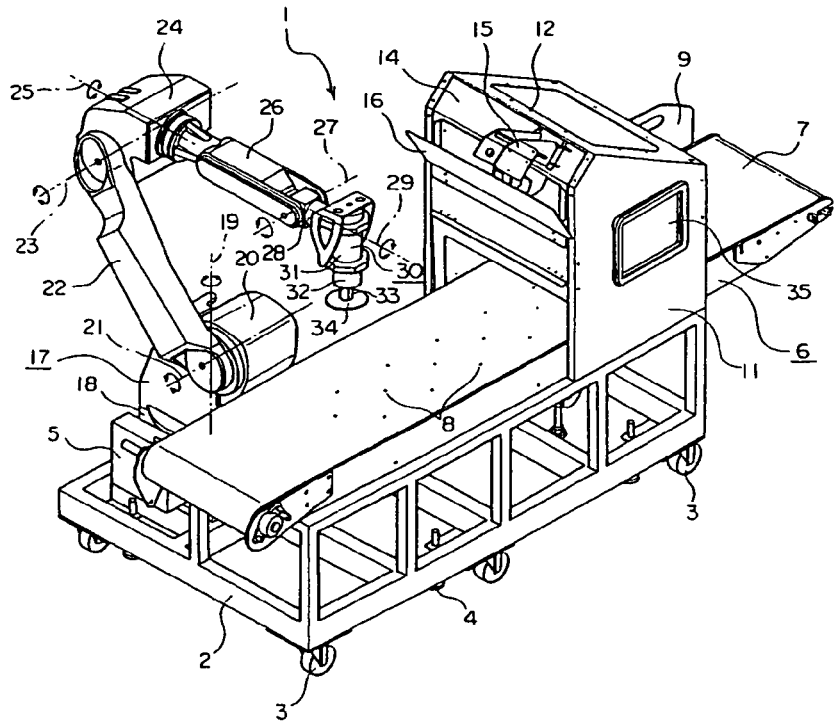
FIG. 1 is a perspective view for showing an embodiment of a spinal column removing apparatus according to the present invention.
Figure 2:
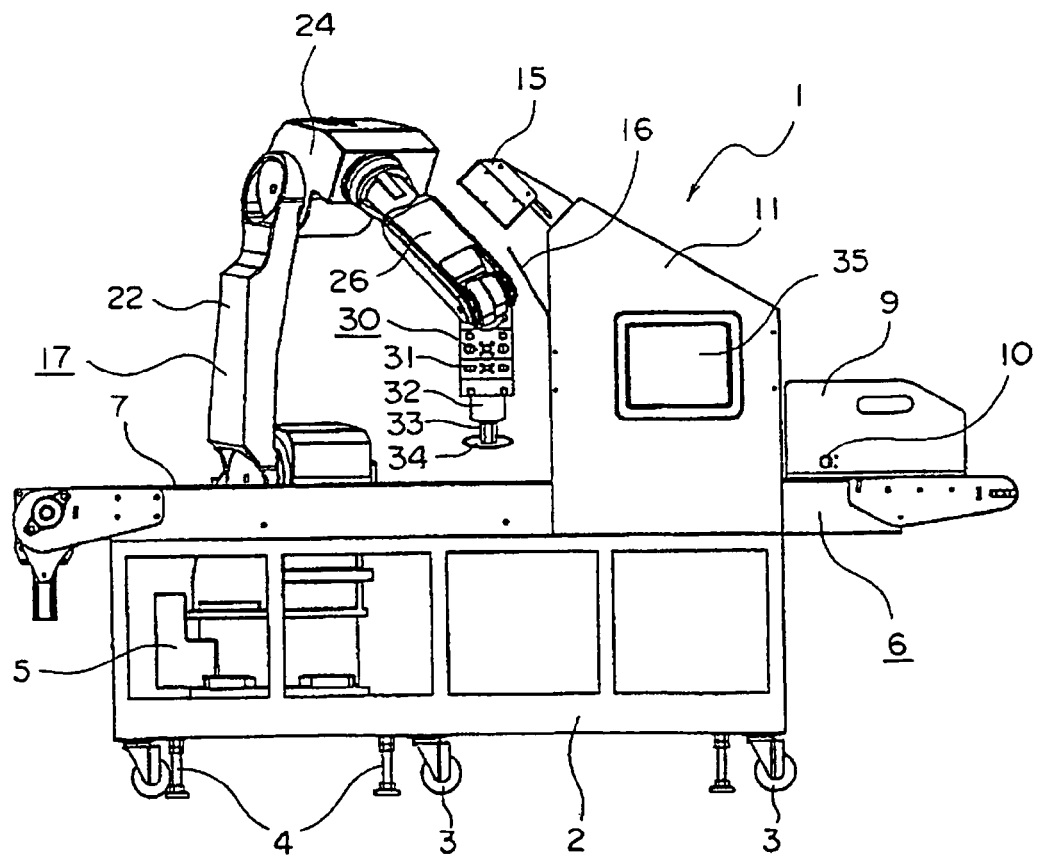
FIG. 2 is a front view of FIG. 1.
Figure 3:
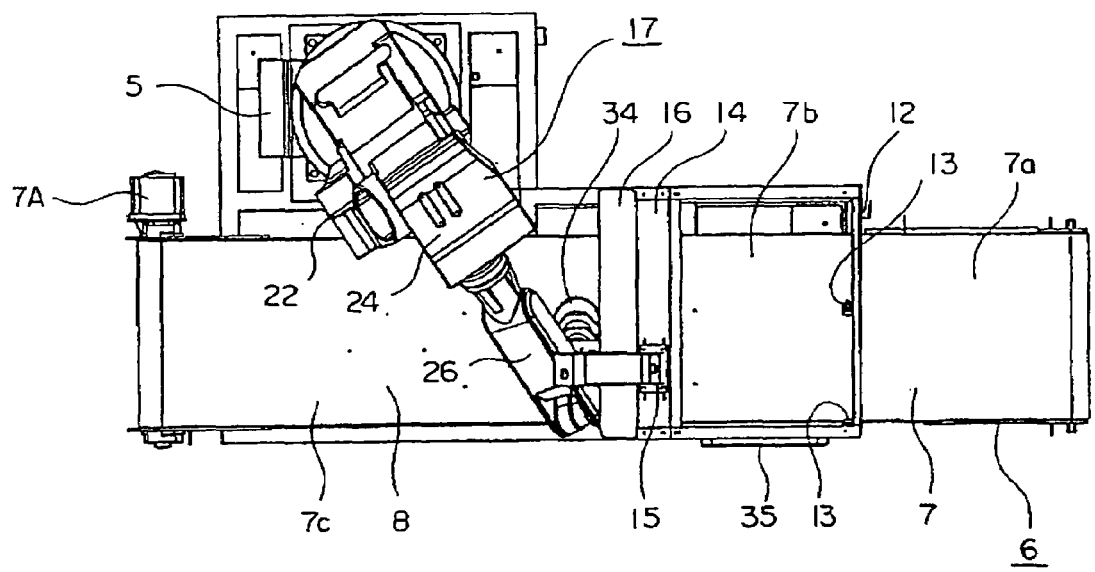
FIG. 3 is a plan view of FIG. 1.

FIG. 1 through FIG. 3 show an embodiment of the spinal column removing apparatus according to the present invention. A spinal column removing apparatus 1 of this embodiment comprises a pedestal 2 to which various types of devices are mounted. On the pedestal 2, there are provided a plurality of wheels 3, 3—for moving along the road surface and a plurality of back-and-forth movable stoppers 4, 4—which are driven to be in contact or isolated from a road surface by a screw in order to restrict the movement of the pedestal 2 at an arbitrary position.

On the pedestal 2, there is provided a control unit 5 such as a CPU (Central Processing Unit) which is a control means for controlling the entire spinal column removing apparatus 1. Further, at roughly the center position of the pedestal 2 in the vertical direction, a belt conveyor 6 is disposed. A conveyor belt 7 of this belt conveyor 6 carries a block of meat B by drive of a motor 7A in the horizontal direction. Further, on the surface of the conveyor belt 7, a plurality of pins 8, 8 —are provided for fixing the block of meat B by piercing it through so that the block of meat B does not move on the conveyor belt 7. The motor 7A is connected to the control unit 5.

The right end of the conveyor belt 7 as in FIG. 2 is a mount part 7a, and the block of meat B is mounted on this mount part 7a by an appropriate means. A guide wall 9 is attached to the pedestal 2 on one side of the mount part 7a, and a sensor 10 such as a photo sensor for detecting the block of meat B that is carried on the conveyor belt 7 is provided to the guide wall 9 on the lower reach side of the conveyor belt 7 in the mount part 7a. This sensor 10 is connected to the control unit 5.

On the lower reach side than the mount part 7a in the conveying direction of the conveyor belt 7, a pair of side walls 11, 11 attached to the pedestal 2 are disposed. A frame 12 is bridged between both of the side walls 11, 11 above the conveyer belt 7. At the frame 12 on the upper reach side of the conveyer belt 7, there are supported a pair of laser oscillators 13, 13 for irradiating laser beams towards the conveyor belt 7 thereunder. These laser oscillators 13 are disposed closer to one side in the width direction of the conveyor belt 7 since the spinal column of the block of meat B comes at a position that is closer to one side in the width direction of the conveyor belt 7.

This part of the conveyor belt 7 is referred to as a detecting part 7b. Further, each laser oscillator 13 is connected to the control unit 5.

A beam 14 is bridged over the both side walls 11, 11 at a part adjacent to the frame 12 on the down reach side in the conveying direction of the conveyor belt 7. To the beam 14 closer to one side in the width direction of the conveyor belt 7, a CCD (charge-coupled device) camera 15 is supported for detecting the position and shape of the spinal column in the block of meat B by detecting the laser beams irradiated to the block of meat B by each of the laser oscillators 13. This CCD camera 15 is connected to the control unit 5. This control unit 5 calculates image data of the position and shape of the spinal column in the block of meat B, and further calculates the best cut position from the calculated position and shape of the spinal column in the block of meat B.

A baffle board 16 which protects the CCD camera 15 from cut scraps is attached to the beam 14 obliquely.

The lower reach side than the detecting part 7b in the conveying direction of the conveyor belt 7 is referred to as a cutting part 7c and, at this part by the side of the conveyor belt 7, a six-axis jointed-arm robot 17 is provided. As shown in detail in FIG. 2, this six-axis jointed-arm robot 17 comprises a first base body 18. A second base body 20 is supported to this first base body 18 through a vertical-direction axis 19 to be rotatable.

A base end part of a first arm 22 extending upwards is supported to the second base body 20 to be able to oscillate through a horizontal-direction axis 21.

A third base body 24 is supported to a top end part of the first arm 22 to be able to oscillate through a horizontal-direction axis 23 which is in parallel with the horizontal-direction axis 21.

A base end part of a second arm 26 is supported to the third base body 24 to be able to oscillate through a horizontal-direction axis 25.

The top end part of the second arm 26 faces the above the cutting part 7c of the conveyor belt 7. A third arm 28 is supported to this top end part of the second arm 26 to be rotatable through a horizontal-direction axis 27 which is in parallel with the horizontal-direction axis 23.

A cutter body 31 of a round edge cutter 30 is suspended from the top end part of the third arm 23 through a horizontal-direction axis 29 which is orthogonal to the horizontal-direction axis 27.

The second base body 20, the first arm 22, the third base body 24, the second arm 26, the third arm 28, and the cutter body 31 of the round edge cutter 30 are independently driven by a driving means, not shown, which is driven by a control signal from the control unit 5. As a result, the posture of the cutter body 31 is controlled three-dimensionally.

Each of the axes 19, 21, 23, 25, 27, 29 is illustrated by a center line for convenience' sake.

A motor 32 is fixed to the cutter body 31 of the round edge cutter 30, and a disc-like round-edge body 34 with continuously-formed saw blades on the outer periphery is supported to an output shaft 33 of this motor 32. The motor 32 is connected to the control unit 5.

A monitor 35 for displaying the cut state of the spinal column, which is connected to the control unit 5, is disposed at one of the side walls 11. This monitor 35 also functions as a touch-panel type operation panel.

Next, operation of the embodiment that is constituted as described above will be described.

Figure 4:
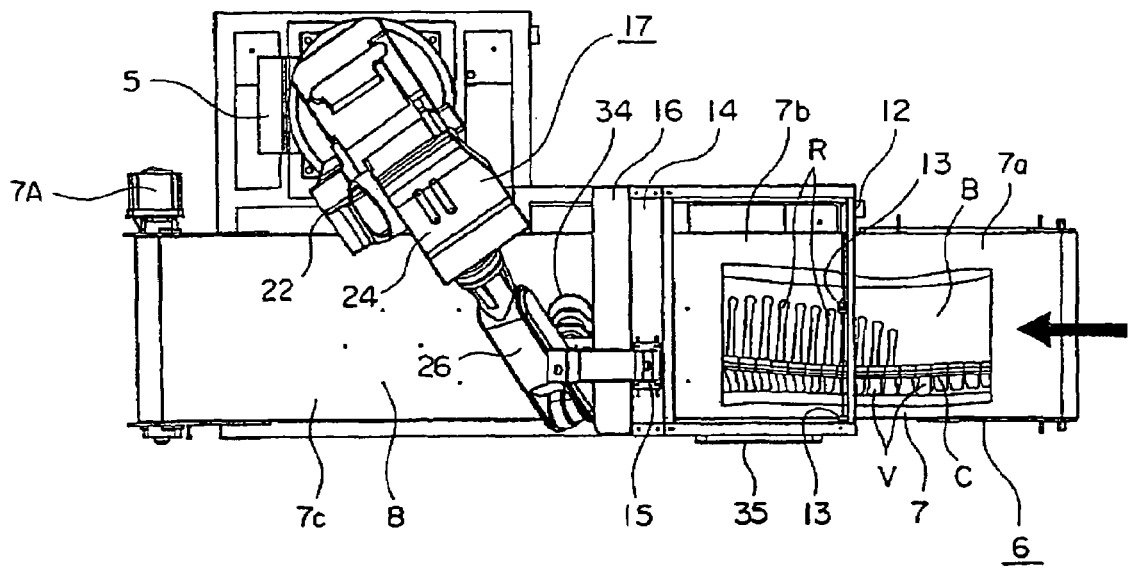
FIG. 4 is a plan view for showing the state when detecting the position and shape of the spinal column in the spinal column removing apparatus of FIG. 1.
Figure 5:
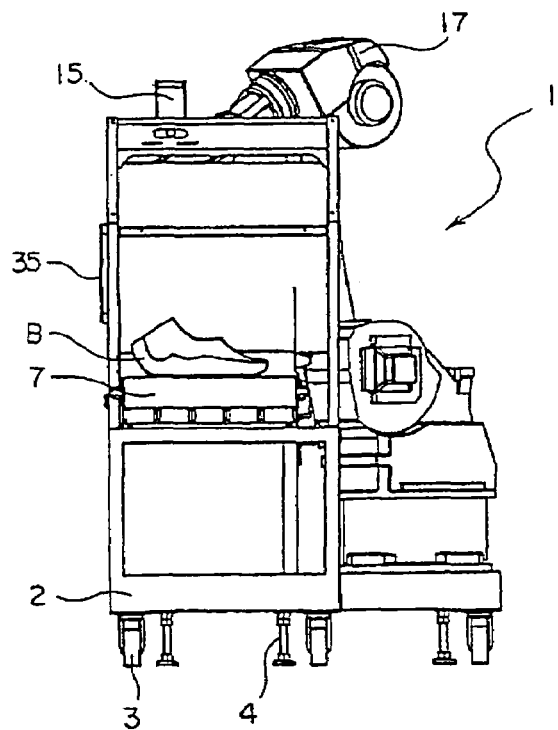
FIG. 5 is a right-side view of FIG. 4.

First, as show in FIG. 4 and FIG. 5, the block of meat B is placed on the mount part 7a of the conveyor belt 7 of the belt conveyor 6. The block of meat B includes the spinal column C, a plurality of ribs R, and thoracic vertebrae V.

When the sensor 10 detects the block of meat B, a detection signal of this sensor 10 is inputted to the control unit 5. The control unit 5 outputs a driving signal to the motor 7A, and the conveyor belt 7 starts to run in the direction shown by an arrow in FIG. 4. Upon this, laser beams from each laser oscillator 13 partially are irradiated to the block of meat B. In the meantime, the CCD camera 15 captures an image of the part of the block of meat B where the laser beams are irradiated. The image data of the block of meat B is inputted to the control unit 5 in order.

Upon this, the control unit 5 calculates image data of the position and shape of the spinal column in the block of meat B, and further calculates the best cut position from the calculated position and shape of the spinal column in the block of meat B.

Figure 6:
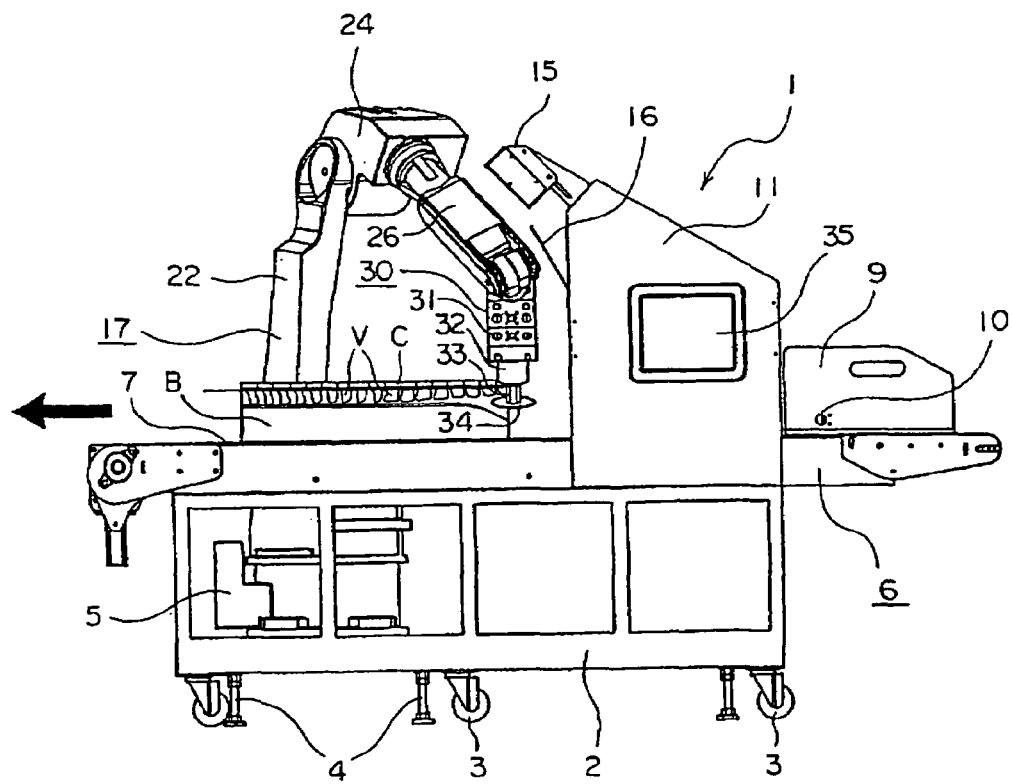
FIG. 6 is a plan view for showing the cutting state performed by the spinal column removing apparatus of FIG. 1.
Figure 7:
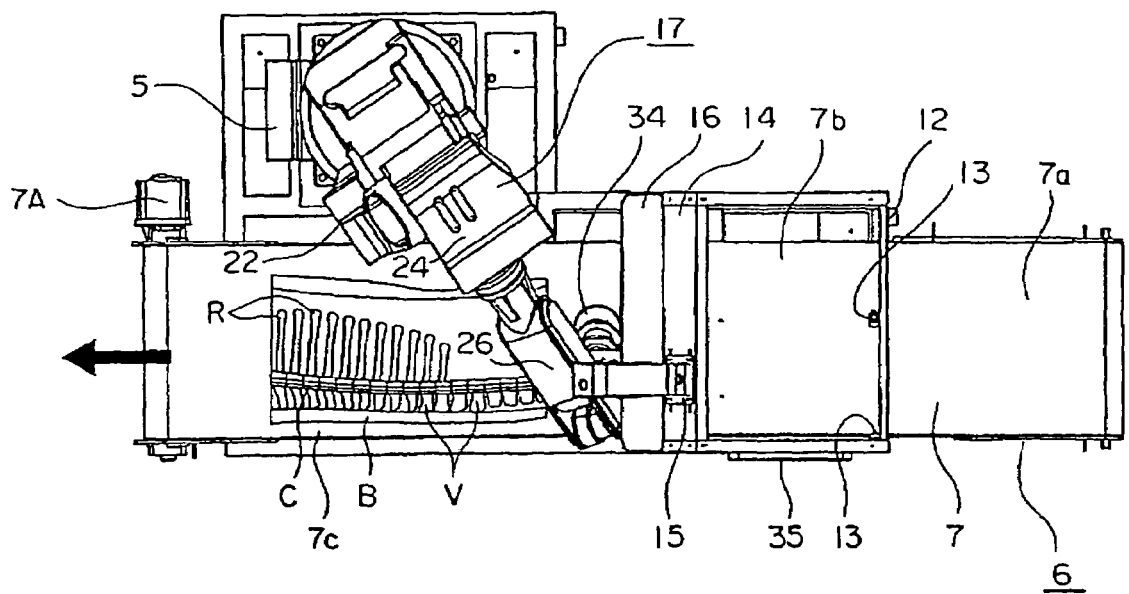
FIG. 7 is a plan view of FIG. 6.
Figure 8:
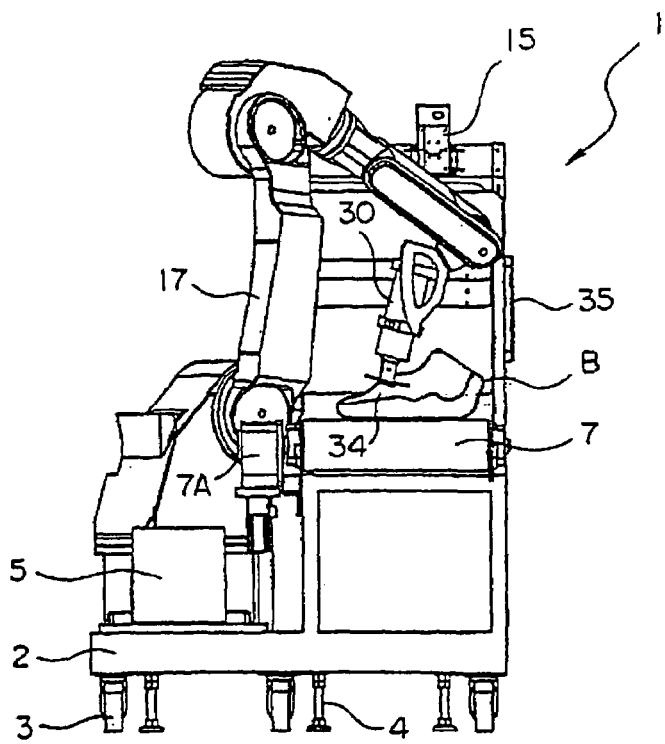
FIG. 8 is a left-side view of FIG. 6, FIGS. 9A and 9B are illustrations for describing the state of cutting a block of meat in V-letter form.

After completing calculation for all the image data of the block of meat B transmitted from the CCD camera 15, the control unit 5 stops the conveyor belt 7 at the point where the block of meat B reaches a prescribed position on the conveyor belt 7, and outputs a control signal to the six-axis jointed-arm robot 17 for controlling the posture of the round-edge body 34 of the round edge cutter 30 to be aligned with the position and shape of the spinal column C of the block of meat B. Meanwhile, the control unit 5 drives the motor 32 for cutting to separate each of the thoracic vertebrae V and spinal column C as shown in FIG. 6.

After completing the cutting from one side of the block of meat B, a control signal is outputted to the six-axis jointed-arm robot 17 so as to place the round-edge body 34 of the round edge cutter 30 on the opposite side of the block of meat B. Then, a control signal is outputted to the six-axis jointed-arm robot 17 so as to cut again the block of meat B at still by the round-edge body 34 of the round edge cutter 30 from the rib R side that is on the opposite side of the prior cutting. Thereby, each of the ribs R and the spinal column C are separated.

Figure 9:
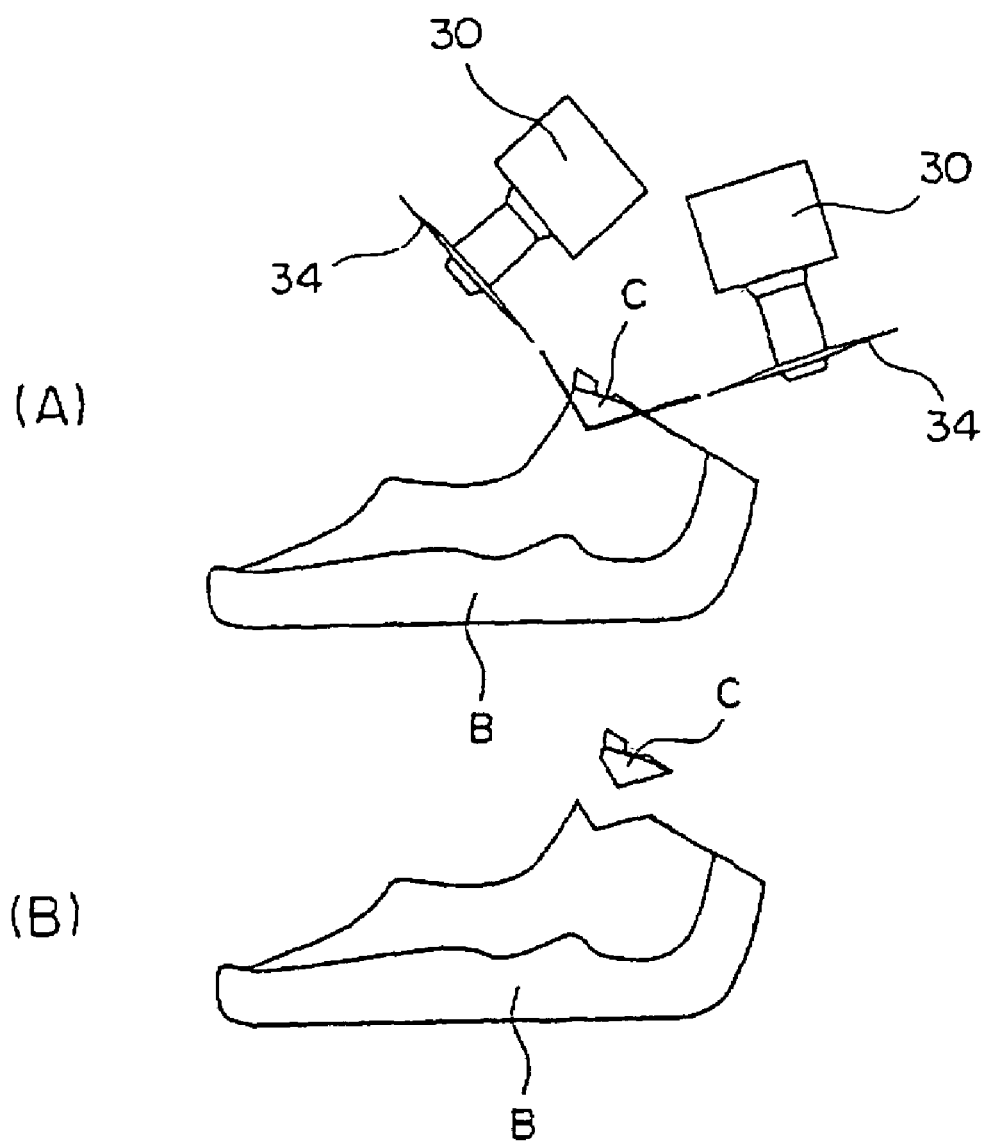

As shown in FIG. 9A, the block of meat B is cut in V-letter form by completely matching the ends of cut lines from both directions in the vicinity of the spin C in the manner as described above. Thereby, as shown in FIG. 9B, the spinal column C can be separated form the block of meat B.

The vicinity of the spinal column C mentioned above means to cut each of the ribs R and each of the thoracic vertebrae V in the very vicinity of the spinal column C. However, depending on the position of the spinal column C, it includes the case of cutting a very small part of the spinal column C itself.

The block of meat B from which the spinal column C is removed is transferred to a next process area from the conveyor belt 7 of the belt conveyor 6.

As described above, in the spinal column removing apparatus 1 of the embodiment, the CCD camera 15 captures the position and shape of the spinal column C in the block of meat B as the image data, the control unit 5 calculates the image data, and the position and the tilt angle of the round-edge body 34 of the round edge cutter 30 are controlled by the six-axis jointed-arm robot 17 in such a manner that the spinal column C can be cut from the block of meat B completely decreasing removal of extra meat as much as possible. Thereby, the spinal column C can be automatically removed.

Therefore, the spinal column can be removed from the block of meat efficiently in term of time and with a good yield of meat quantity. Moreover, workers do not have to be skilled so that anyone can perform the same operation.

EXAMPLES

Figure 10:
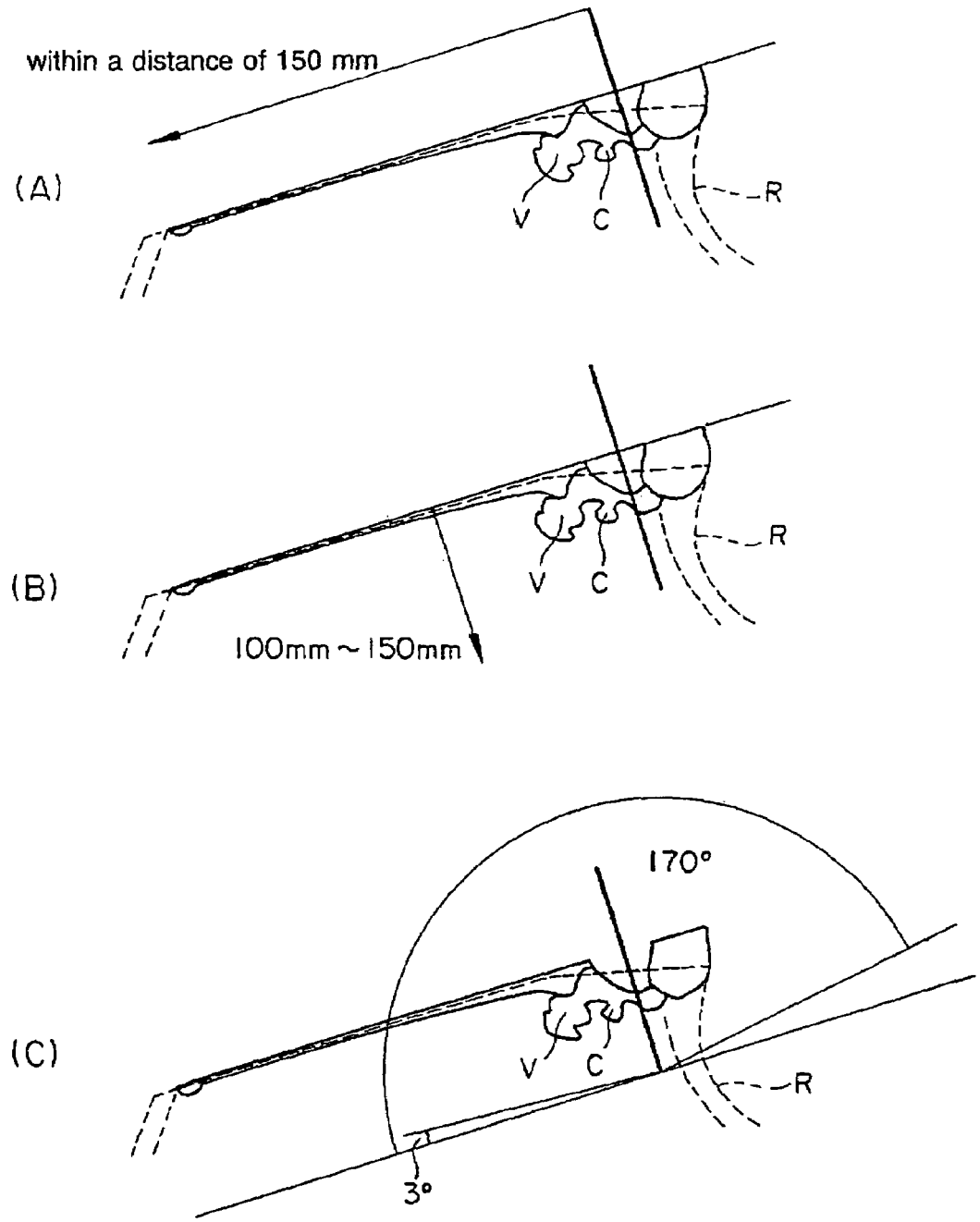
FIGS. 10A, 10B and 10C are illustration for describing a preferable cutting condition for beef.

The angle of the V-letter form at the time of separating the spinal column as described above by cutting, in two times, the block of meat B in a complete V-letter form is set as an arbitrary angle less than 180 degrees. Specific numeral values of the specific angle and cut depth for beef are shown in FIG. 10.

FIG. 10A shows a specific example of the cutting start position in the block of meat B. It is preferable to be within a distance of 150 mm from the center of the marrow the spinal column that is cut in half.

FIG. 10B shows a specific example of the cut-in depth from the surface of the block of meat B. The cut-in depth is preferable to be within the range of 10-150 mm from the surface of the meat.

FIG. 10C shows the cutting angle, and the most preferable range is 3 degrees at the minimum from the surface of the meat on the spinous thoracic vertebrae V side and the angle of 10 degrees at the minimum (the angle of 170 degrees from the thoracic vertebrae V side) from the surface of the meat on the ribs R side.

Also, specific numeral values of the specific angle and cut depth for pork are shown in FIG. 10.

Figure 11:
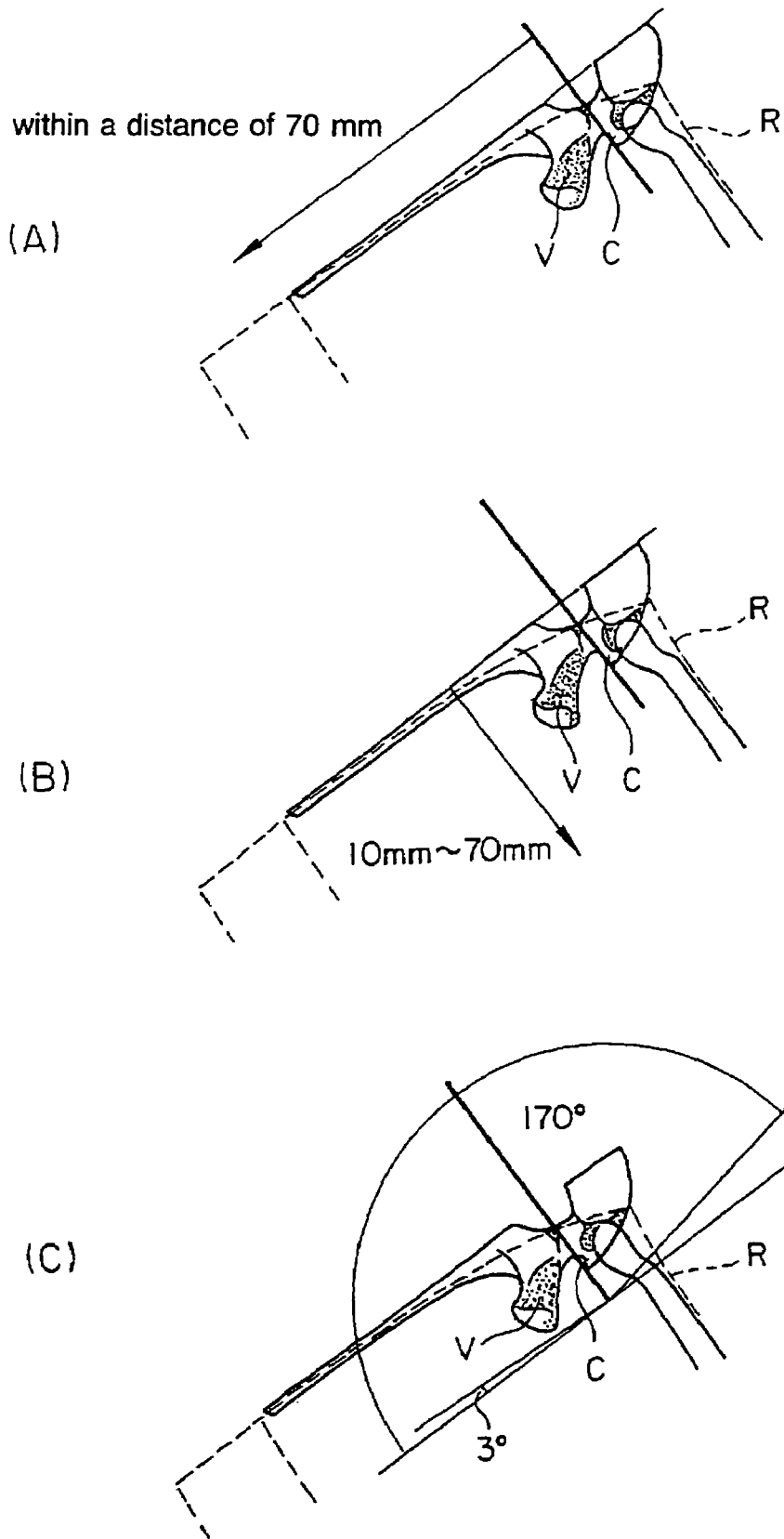
FIGS. 11A, 11B and 11C are illustration for describing a preferable cutting condition for pork.

FIG. 11A shows a specific example of the cutting start position in the block of meat B. It is preferable to be within a distance of 70 mm from the center of the marrow the spinal column that is cut in half.

FIG. 11B shows a specific example of the cut-in depth from the surface of the block of meat B. The cut-in depth is preferable to be within the range of 10-70 mm from the surface of the meat.

FIG. 11C shows the cutting angle, and the most preferable range is 3 degrees at the minimum from the surface of the meat on the spinous thoracic vertebrae V side and the angle of 10 degrees at the minimum (the angle of 170 degrees from the thoracic vertebrae V side) from the surface of the meat on the ribs R side.

The present invention is not limited to the above-described embodiment but various modifications are possible as necessary.

The aforementioned embodiment has been described by referring to the case where the spinal column of the block of meat is cut in a V-letter form in two separate cuttings using a single round edge cutter. However, it is possible to remove the spinal column from the block of meat more efficiently in terms of time by using two round edge cutters to cut the block of meat by slightly shifting the positions so that the edge points of both round edge cutters do not come in contact.

Further, the aforementioned embodiment has been described by referring to the case where the block of meat is placed on the conveyor belt and, while moving the block of meat, the position and shape of the spinal column is detected by the CCD camera and the spinal column is removed by the round edge cutter. However, detection of the position and shape of the spinal column and removal of the spinal column may be performed by moving the CCD camera and the round edge cutter without moving the block of meat.

Furthermore, the aforementioned embodiment has been described by referring to the case of the block of meat in the loin/rib part. However, similarly, the spinal column can be excellently removed from the block of meat of the shoulder loin part or the thigh part.

Moreover, it is also possible to remove the spinal column by hanging and moving the block of meat.

Also, it is possible to make the image data of the spinal column of the block of meat by mounting the laser oscillator and the CCD camera to the six-axis jointed-arm robot.

The invention claimed is:

1. A spinal column removing method, characterized in that said spinal column removing method detects position and shape of a spinal column in a block of meat that includes at least a part of said spinal column, and cuts said block of meat in a vicinity of said spinal column in a V-letter form from two directions by three-dimensionally controlling posture of a cutter based on an image data about said detected position and shape of said spinal column so as to remove said spinal column from said block of meat.

2. The spinal column removing method according to claim 1, characterized in that said V-letter form has an angle of less than 180 degrees.

3. A spinal column removing apparatus, characterized in that said spinal column removing apparatus comprises:
   a laser oscillator which irradiates a laser beam to a block of meat that includes at least a part of a spinal column;
   a charge-coupled device camera which detects position and shape of said spinal column in said block of meat by detecting said laser beam that is irradiated to said block of meat;
   a control means which calculates said position and shape of said spinal column from an image data that is detected by said charge-coupled device camera;
   a robot whose posture is three-dimensionally controlled by a control signal from said control means; and
   a round edge cutter to be driven rotationally, which is supported to said robot, wherein
   said block of meat in a vicinity of said spinal column is cut in a V-letter form from two directions by said round edge cutter so as to remove said spinal column from said block of meat.

4. A spinal column removing apparatus, characterized in that said spinal column removing apparatus comprises:
   a laser oscillator which irradiates a laser beam to a block of meat that includes at least a part of a spinal column;
   a charge-coupled device camera which detects position and shape of said spinal column in said block of meat by detecting said laser beam that is irradiated to said block of meat;
   a control means which calculates said position and shape of said spinal column from an image data that is detected by said charge-coupled device camera;
   a pair of robots whose postures are three-dimensionally controlled, respectively, by a control signal from said control means; and
   round edge cutters to be drive rotationally, which are supported to each of said robots, wherein
   said block of meat in a vicinity of said spinal column is cut in a V-letter form from two directions by said pair of round edge cutters so as to remove said spinal column from said block of meat.

5. The spinal column removing apparatus according to claim 3 or 4, characterized in that said V-letter form has an angle of less than 180 degrees.

* * * * *